United States Patent
Yeh (10) Patent No.: US 11,090,522 B2
(45) Date of Patent: Aug. 17, 2021

(54) EDDY CURRENT RESISTANCE GENERATING DEVICE

(71) Applicant: PREVENTIVE MEDICAL HEALTH CARE CO., LTD., Taichung (TW)

(72) Inventor: Ching-Yu Yeh, Taichung (TW)

(73) Assignee: PREVENTIVE MEDICAL HEALTH CARE CO., LTD., Taichung (TW)

( * ) Notice: Subject to any disclaimer, the term of this patent is extended or adjusted under 35 U.S.C. 154(b) by 73 days.

(21) Appl. No.: 16/271,897

(22) Filed: Feb. 11, 2019

(65) Prior Publication Data

US 2019/0247693 A1 Aug. 15, 2019

Related U.S. Application Data (60) Provisional application No. 62/630,220, filed on Feb. 13, 2018.

(51) Int. Cl.
*A63B 21/005* (2006.01)
*B61H 7/08* (2006.01)
*H02K 49/04* (2006.01)

(52) U.S. Cl.
CPC ......... *A63B 21/0051* (2013.01); *B61H 7/083* (2013.01); *H02K 49/04* (2013.01); *A63B 21/0052* (2013.01); *A63B 2209/00* (2013.01); *A63B 2209/08* (2013.01)

(58) Field of Classification Search
None
See application file for complete search history.

(56) References Cited

U.S. PATENT DOCUMENTS

| | | | | |
|---|---|---|---|---|
| 5,685,806 A | * | 11/1997 | Yu | A63B 21/0051 482/6 |
| 6,062,350 A | * | 5/2000 | Spieldiener | A63G 31/00 188/161 |
| 6,095,953 A | * | 8/2000 | Lee | A63B 21/0051 188/164 |
| 6,412,611 B1 | * | 7/2002 | Pribonic | B60L 7/28 188/165 |
| 7,004,888 B1 | * | 2/2006 | Weng | A63B 21/0051 482/57 |
| 2005/0176560 A1 | * | 8/2005 | Chen | A63B 21/0052 482/94 |
| 2018/0015324 A1 | * | 1/2018 | Yeh | A63B 22/001 |

FOREIGN PATENT DOCUMENTS

| | | |
|---|---|---|
| CN | 101951051 A | 1/2011 |
| CN | 104436525 A | 3/2015 |
| EP | 2525474 A1 | 11/2012 |
| GB | 2265553 A | 10/1993 |
| TW | 329464 B | 4/1998 |

* cited by examiner

*Primary Examiner* — Sundhara M Ganesan
*Assistant Examiner* — Shila Jalalzadeh Abyaneh
(74) *Attorney, Agent, or Firm* — CKC & Partners Co., LLC (57) ABSTRACT

An eddy current resistance generating device includes a magnet base, a plurality of magnets, a conductive member and a friction set. The magnet base has two inner walls. The magnets are disposed on the two inner walls of the magnet base, wherein the magnets on the two inner walls are face to each other. The conductive member is located between the magnets on the two inner walls for generating an eddy current resistance while the magnets are moved relative to the conductive member. The friction set is disposed between each of the magnets and the conductive member, wherein the friction set includes at least one friction matrix.

7 Claims, 11 Drawing Sheets

EDDY CURRENT RESISTANCE GENERATING DEVICE

RELATED APPLICATIONS

This application claims priority to U.S. Provisional Patent Application No. 62/630,220, filed Feb. 13, 2018, which is herein incorporated by reference.

BACKGROUND

Technical Field

The present disclosure relates to a resistance generating device. More particularly, the present disclosure relates to an eddy current resistance generating device.

Description of Related Art

With recent industry advances, requirements for both of lifetime and cost of exercise equipment or rehabilitation equipment are increased. During using the exercise equipment or the rehabilitation equipment, some elements in the exercise equipment or the rehabilitation equipment are easily broken or abrasion. However, the elements are usually expensive, and are not easy to replace by the user. Therefore, it is important for providing an exercise equipment or a rehabilitation equipment with longer lifetime or having cheap expendables.

SUMMARY

According to one aspect of the present disclosure, an eddy current resistance generating device includes a magnet base, a plurality of magnets, a conductive member and a friction set. The magnet base has two inner walls. The magnets are disposed on the two inner walls of the magnet base, wherein the magnets on the two inner walls are face to each other. The conductive member is located between the magnets on the two inner walls for generating an eddy current resistance while the magnets are moved relative to the conductive member. The friction set is disposed between each of the magnets and the conductive member, wherein the friction set includes at least one friction matrix.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
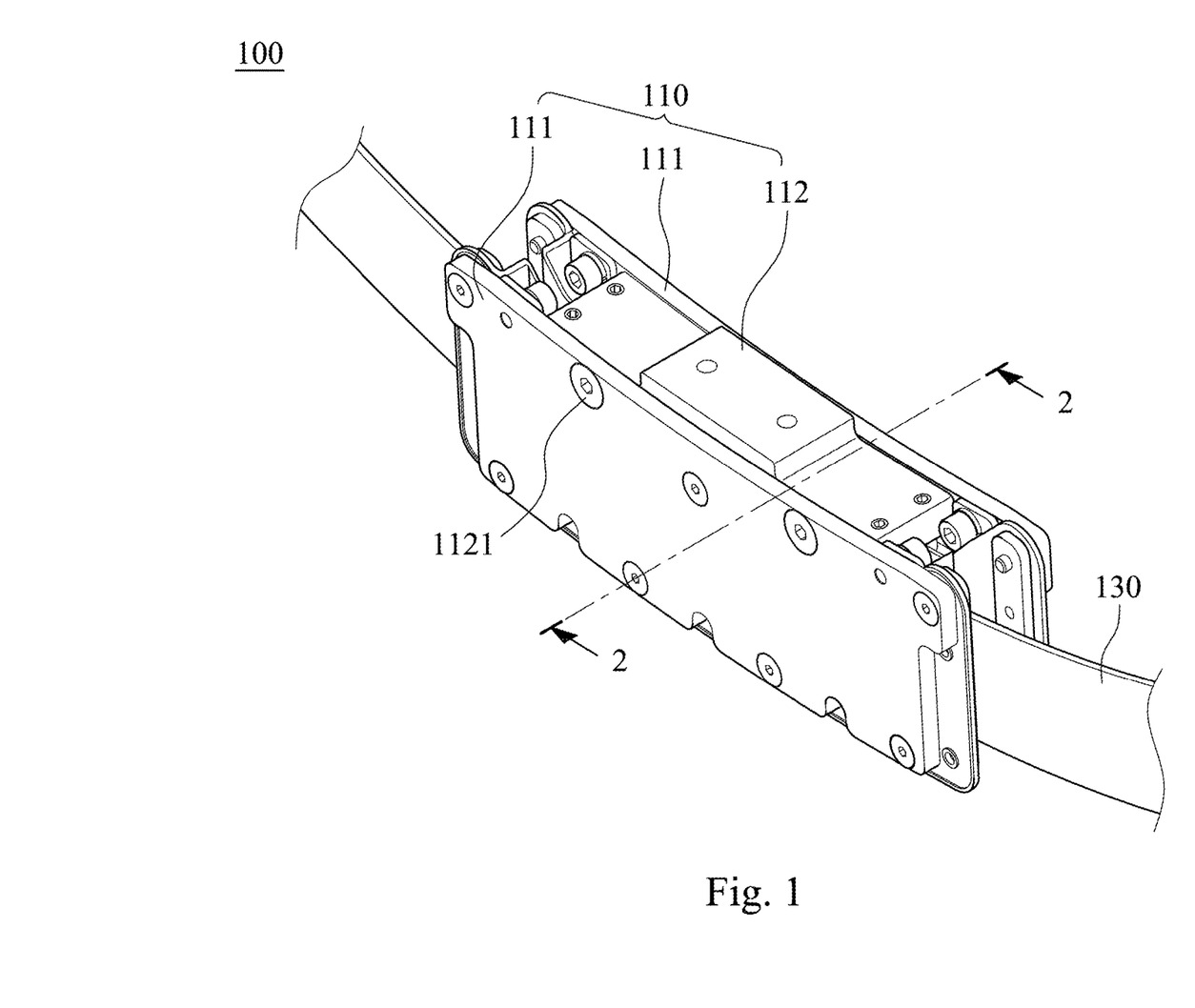
FIG. 1 is a three-dimensional schematic view of an eddy current resistance generating device according one embodiment of the present disclosure.
Figure 2:
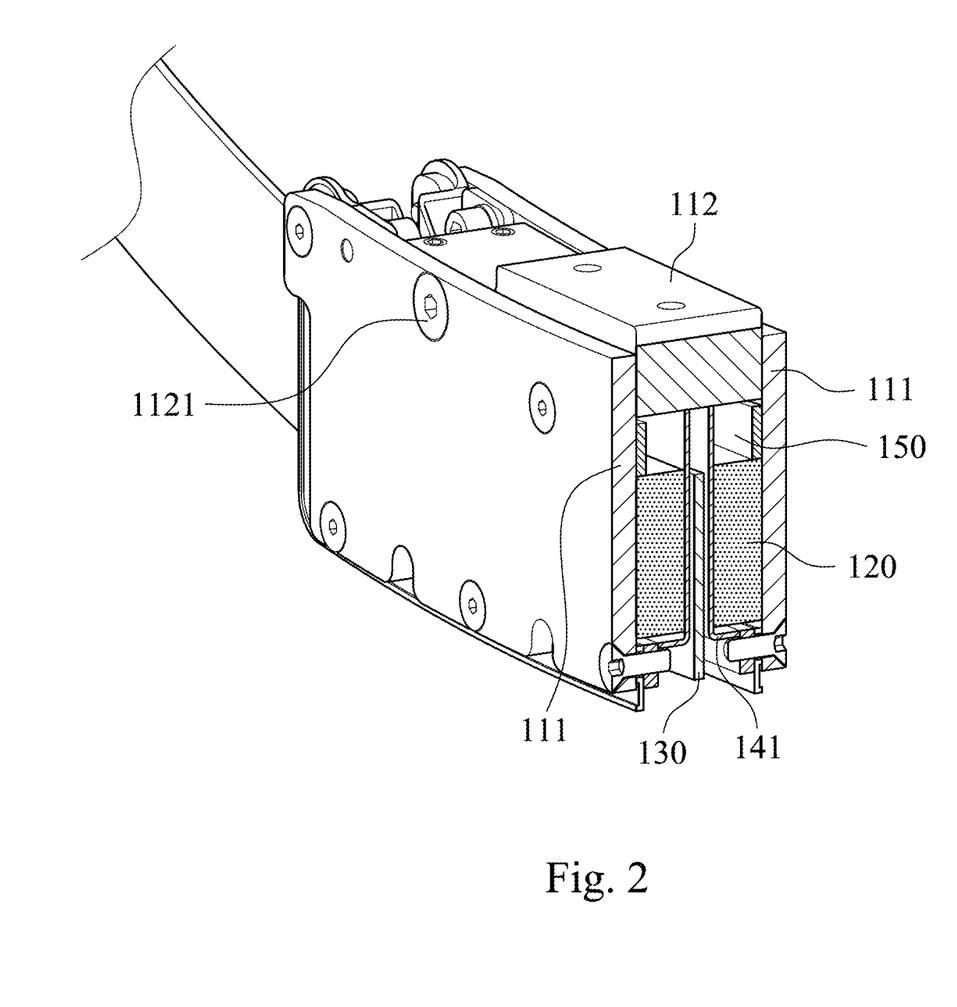
FIG. 2 is a cross-sectional view along line 2-2 in FIG. 1.
Figure 3:
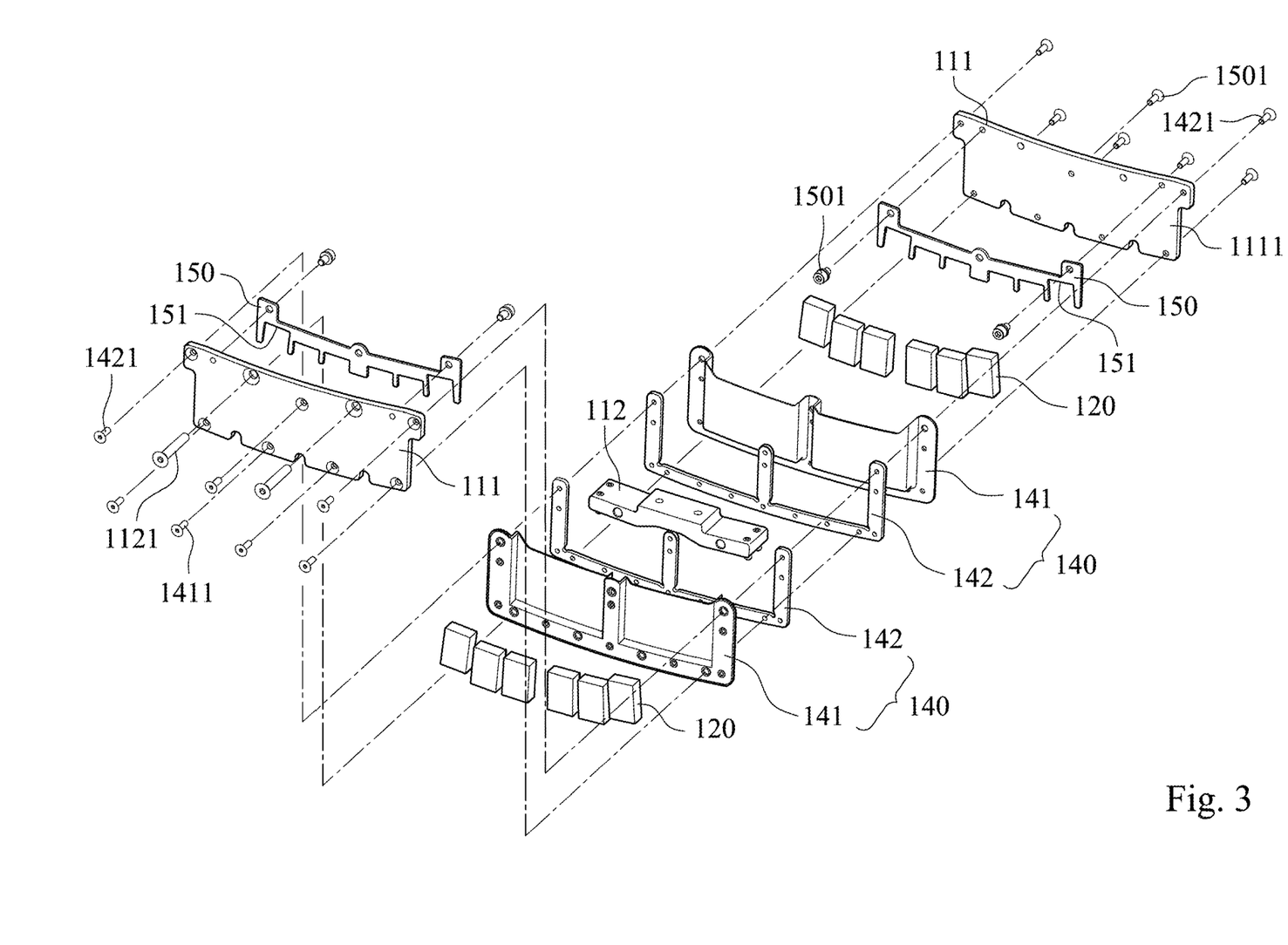
FIG. 3 is an exploded view of the eddy current resistance generating device of FIG. 1.

FIG. 1 is a three-dimensional schematic view of an eddy current resistance generating device 100 according one embodiment of the present disclosure. FIG. 2 is a cross-sectional view along line 2-2 in FIG. 1. FIG. 3 is an exploded view of the eddy current resistance generating device 100 in FIG. 1. In FIG. 1, FIG. 2 and FIG. 3, the eddy current resistance generating device 100 can be applied to various exercise equipments and rehabilitation equipments which have the function for providing eddy current resistance during operation.

The eddy current resistance generating device 100 includes a magnet base 110, a plurality of magnets 120, a conductive member 130 and a friction set 140. The magnet base 110 has two inner walls 1111, the magnets 120 are disposed on the two inner walls 1111 of the magnet base 110, wherein the magnets 120 on the two inner walls 1111 are face to each other. The conductive member 130 is located between the magnets 120 on the two inner walls 1111 for generating an eddy current resistance while the magnets 120 are moved relative to the conductive member 130. The friction set 140 is disposed between each of the magnets 120 and the conductive member 130. The conductive member 130 can be disposed on the exercise equipment or the rehabilitation equipment which the eddy current resistance generating device applied on, and when the magnet base 110 is driven along the conductive member 130, the magnets 120 are moved relative to the conductive member 130 for generating the eddy current resistance in accordance with Lenz's law. In order to avoid the abrasion between the magnets 120 and the conductive member 130, the friction set 140 is disposed between each of the magnets 120 and the conductive member 130.

In detail, the magnet base 110 includes two base members 111 and a connecting member 112. The base members 111 are connected to two sides of the connecting member 112 via connecting units 1121, such as screws. The inner walls 1111 are located on the two base members 111, respectively. Therefore, the magnet base 110 can be disassembled when the elements disposed inside are broken or should be changed instead of replacing the whole magnet base 110.

Figure 4:
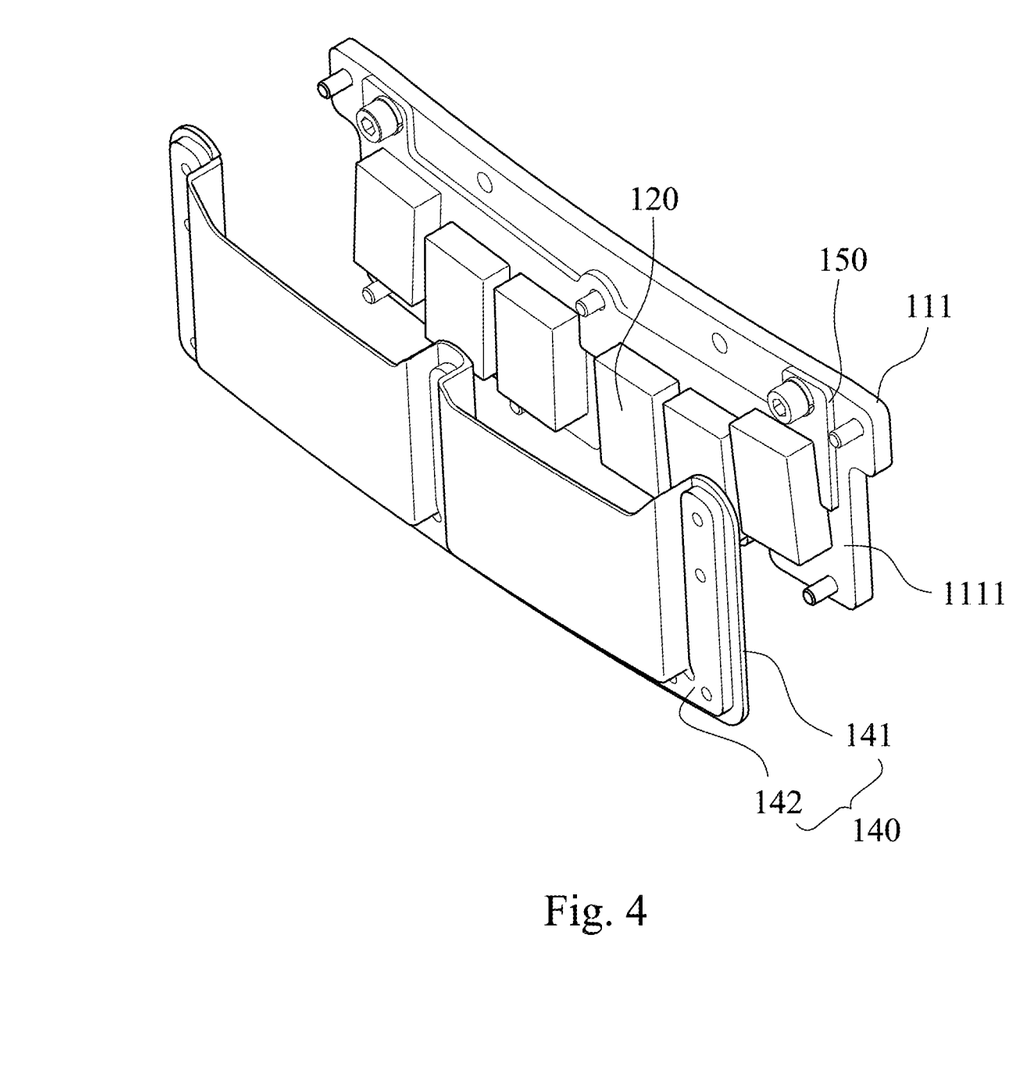
FIG. 4 shows a schematic view of the magnets of the eddy current resistance generating device of FIG. 1.

The magnets 120 are disposed on the two inner walls 1111 of the base members 111. According to the embodiment of FIG. 1, the eddy current resistance generating device 100 includes 12 magnets 120, and each 6 magnets 120 are disposed on each inner wall 1111. FIG. 4 shows a schematic view of the magnets 120 of the eddy current resistance generating device 100 of FIG. 1. In order to position the magnets 120 on each inner wall 1111, the eddy current resistance generating device 100 can include two interval members 150 for positioning the magnets 120 on the two inner walls 1111, wherein each of the interval members 150 can be connected on each of the base members 111 via connecting members 1501, such as screws. Each of the two interval members 150 has a plurality of positioning concave structures 151, and each of the magnets 120 is disposed and embedded in each of the positioning concave structures 151. Thus, the magnets 120 can be positioned on the inner walls 1111, and by the arrangement of the positioning concave structures 151, there is an interval between each two magnets 120 adjacent to each other. It is favorable for enhancing the stability of the magnets 120.

The friction set 140 at least one friction matrix 141 covered on the magnets 120 on at least one of the two inner walls 1111. According to the embodiment of FIG. 3 and FIG. 4, a number of the at least one friction matrix 141 is two, wherein each of the two friction matrices 141 is covered on the magnets 120 on each of the two inner walls 1111, and the friction matrices 141 can be connected to the base members 111 via the connecting member 1411, such as screws. By the arrangement, the magnets 120 and the conductive member 130 would not connect to each other directly, and the abrasion between the magnets 120 and the conductive member 130 can be avoided effectively. Moreover, the friction matrix 141 can be made of fabric material, leather material, or plastic material, and will not be limited thereto. By such arrangement, the noise generated between the magnets 120 and the conductive member 130 can be further avoided.

Furthermore, the friction set 140 can further includes at least one pressing plate 142 for positioning the friction matrix 141 on the at least one of the two inner walls 1111. According to the embodiment of FIG. 3, a number of the pressing plate 142 is two. Each of the pressing plates 142 is for positioning each friction matrix 141 on each of the two inner walls 1111. Each pressing plate 142 and each friction matrix 141 can be positioned on each base member 111 via connecting member 1421, thus Each pressing plate 142 and each friction matrix 141 can be positioned in the magnet base 110 stably, and it is favorable for arranging the friction matrix 141 to cover the magnets 120 and will not affect the generation of the eddy current resistance while dispose the friction matrix 141 between the magnets 120 and the conductive member 130.

Figure 5:
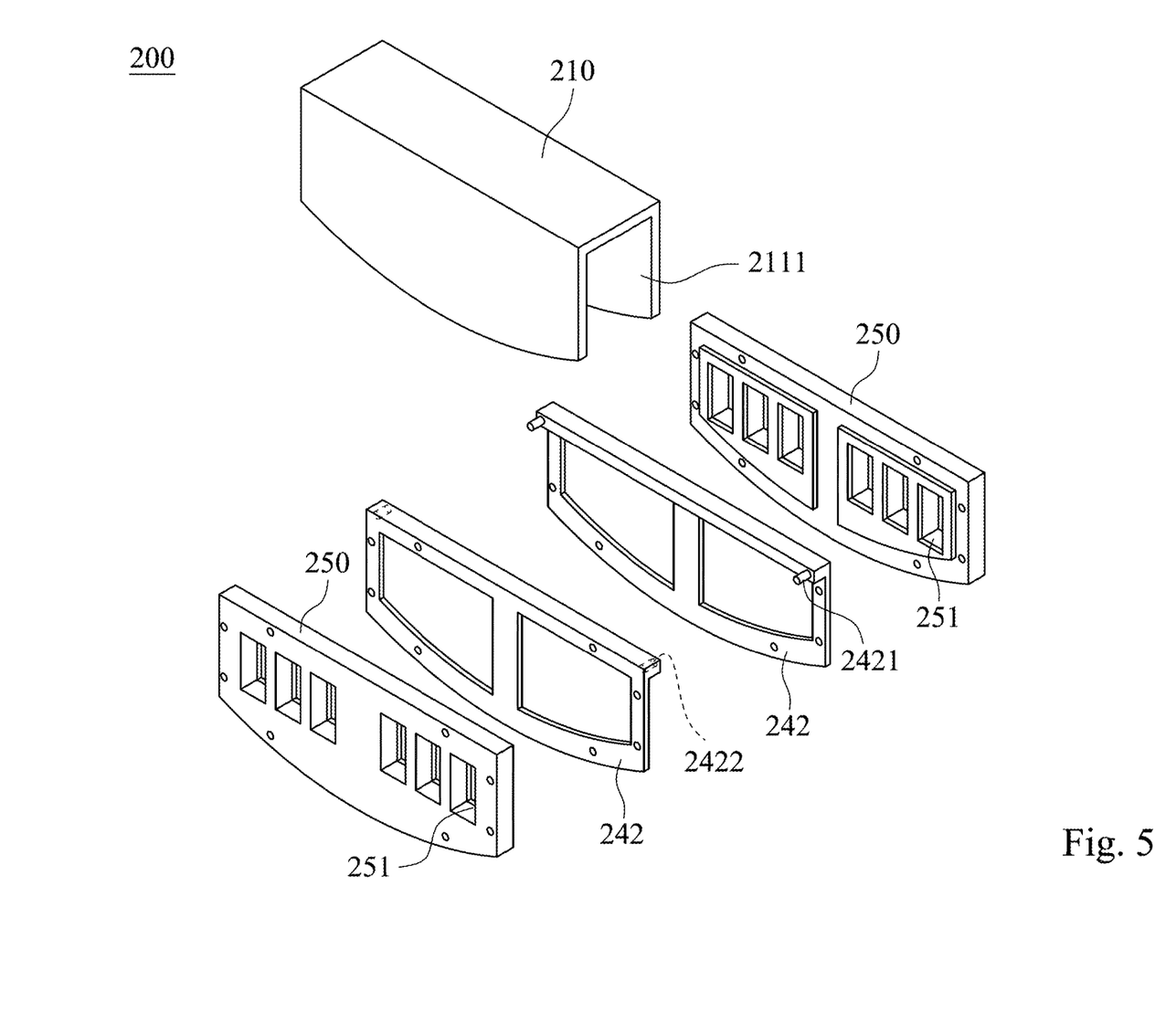
FIG. 5 is a three-dimensional exploded view of an eddy current resistance generating device according another embodiment of the present disclosure.

FIG. 5 is a three-dimensional exploded view of an eddy current resistance generating device 200 according another embodiment of the present disclosure. The eddy current resistance generating device 200 includes a magnet base 210, a plurality of magnets (not shown), a conductive member (not shown) and a friction set (its reference numeral is omitted). The magnet base 210 has two inner walls 2111, the magnets are disposed on the two inner walls 2111 of the magnet base 210, wherein the magnets 220 on the two inner walls 2111 are face to each other. The conductive member is located between the magnets 220 on the two inner walls 2111 for generating an eddy current resistance while the magnets 220 are moved relative to the conductive member 230. The friction set is disposed between each of the magnets and the conductive member. The conductive member can be disposed on the exercise equipment or the rehabilitation equipment which the eddy current resistance generating device applied on, and when the magnet base 210 is driven along the conductive member, the magnets are moved relative to the conductive member for generating the eddy current resistance in accordance with Lenz's law. In order to avoid the abrasion between the magnets and the conductive member, the friction set is disposed between each of the magnets and the conductive member.

According to the embodiment of FIG. 5, the magnet base 210 is integrally formed by iron material. In order to position the magnets, the eddy current resistance generating device 200 can further include two magnet positioning members 250 for positioning the magnets on the two inner walls 2111, wherein each of the two magnet positioning members 250 has a plurality of positioning holes 251, and each of the magnets is disposed and embedded in each of the positioning holes 251. Thus, the magnets can be positioned on the inner walls 2111, and by the arrangement of the positioning holes 251, there is an interval between each two magnets adjacent to each other. It is favorable for enhancing the stability of the magnets. Furthermore, the two magnet positioning members 250 are formed by plastic injection molding, and are formed into the same shape. Therefore, only one mold for forming the magnet positioning members is needed so as to reduce the manufacturing cost.

According to the embodiment of FIG. 5, the friction set can include two friction matrices (not shown) and two pressing plates 242, wherein the friction matrices are for covering the magnets and is the same with the friction matrices 141 according to the embodiment of FIG. 3, and will not be shown and described again herein. The pressing plates 242 are for positioning the friction matrix on the two inner walls 2111, respectively. The pressing plates 242 can be formed by plastic injection molding. One of the pressing plates 242 has connecting pins 2421, the other one of the pressing plates 242 has connecting concaves 2422, so that the two pressing plates 242 can be connected to each other by embedding each connecting pins 2421 to the connecting concaves 2422 so as to enhance the stability while the two pressing plates 242 are disposed in the magnet base 210.

Figure 6:
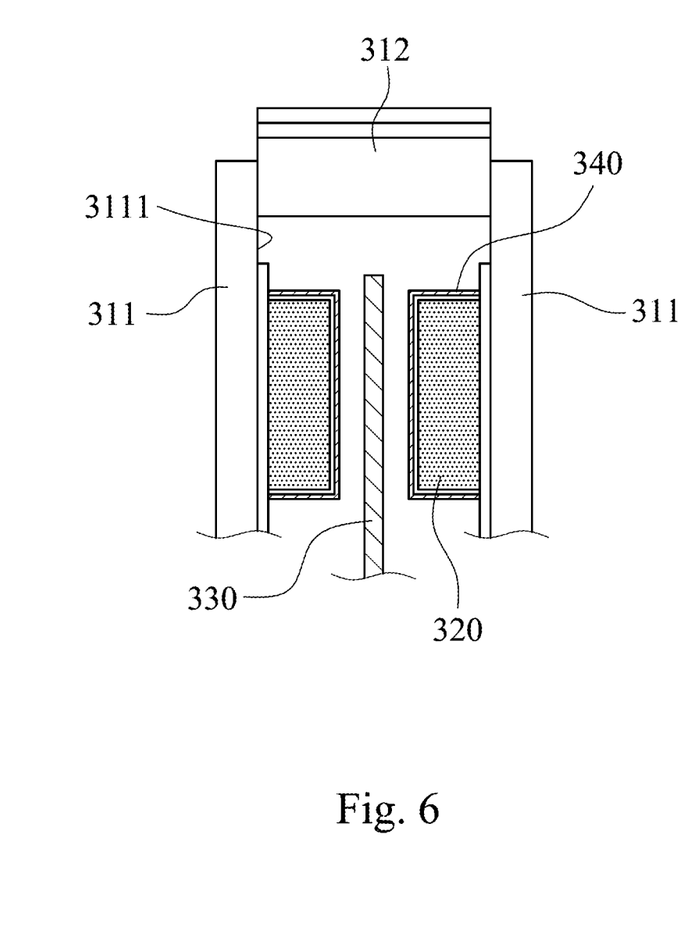
FIG. 6 is a schematic view of an eddy current resistance generating device according to further another embodiment of the present disclosure.

FIG. 6 is a schematic view of an eddy current resistance generating device according to further another embodiment of the present disclosure. In FIG. 6, the eddy current resistance generating device includes a magnet base (its reference numeral is omitted), a plurality of magnets 320, a conductive member 330 and a friction set (its reference numeral is omitted). The magnet base includes two base members 311 and a connecting member 312, and has two inner walls 3111 on the base member 311, respectively. The base members 311 and the connecting member 312 are the same with the base members 311 and a connecting member 312, and will not be described again herein. The magnets 320 are disposed on the two inner walls 3111 of the magnet base, wherein the magnets 320 on the two inner walls 3111 are face to each other. The conductive member 330 is located between the magnets 320 on the two inner walls 3111 for generating an eddy current resistance while the magnets 320 are moved relative to the conductive member 330. The friction set is disposed between each of the magnets and the conductive member. The conductive member 330 can be disposed on the exercise equipment or the rehabilitation equipment which the eddy current resistance generating device applied on, and when the magnet base is driven along the conductive member 330, the magnets 320 are moved relative to the conductive member 330 for generating the eddy current resistance in accordance with Lenz's law. In order to avoid the abrasion between the magnets 320 and the conductive member 330, the friction set is disposed between each of the magnets 320 and the conductive member 330.

In detail, the friction set includes a plurality of friction matrices 340, each of the friction matrices 340 is covered on each of the magnets 320. Thus, the abrasion between the magnets 320 and the conductive member 330 can be avoided effectively.

Figure 7:
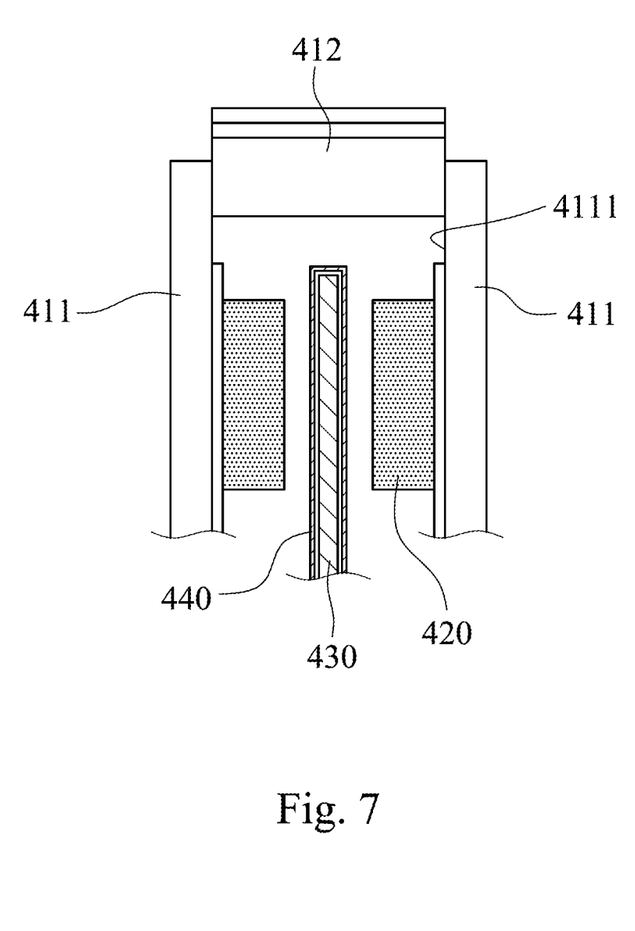
FIG. 7 is a schematic view of an eddy current resistance generating device according to yet another embodiment of the present disclosure.

FIG. 7 is a schematic view of an eddy current resistance generating device according to yet another embodiment of the present disclosure. In FIG. 7, the eddy current resistance generating device includes a magnet base (its reference numeral is omitted), a plurality of magnets 420, a conductive member 430 and a friction set (its reference numeral is omitted). The magnet base includes two base members 411 and a connecting member 412, and has two inner walls 4111 on the base member 411, respectively. The base members 411 and the connecting member 412 are the same with the base members 411 and a connecting member 412, and will not be described again herein. The magnets 420 are disposed on the two inner walls 4111 of the magnet base, wherein the magnets 420 on the two inner walls 4111 are face to each other. The conductive member 430 is located between the magnets 420 on the two inner walls 4111 for generating an eddy current resistance while the magnets 420 are moved relative to the conductive member 430. The friction set is disposed between each of the magnets and the conductive member. The conductive member 430 can be disposed on the exercise equipment or the rehabilitation equipment which the eddy current resistance generating device applied on, and when the magnet base is driven along the conductive member 430, the magnets 420 are moved relative to the conductive member 430 for generating the eddy current resistance in accordance with Lenz's law. In order to avoid the abrasion between the magnets 420 and the conductive member 430, the friction set is disposed between each of the magnets 420 and the conductive member 430.

In detail, the friction set includes one friction matrices 440, the friction matrix 440 is covered on the conductive member 430. Thus, the abrasion between the magnets 420 and the conductive member 430 can be avoided effectively.

Figure 8:
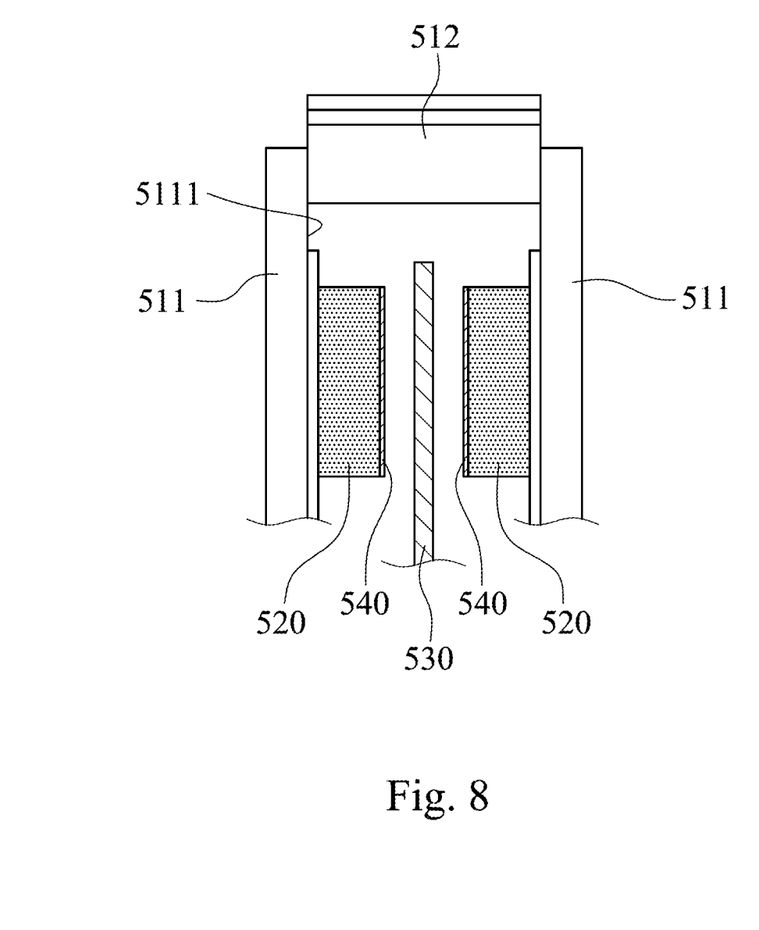
FIG. 8 is a schematic view of an eddy current resistance generating device according to still another embodiment of the present disclosure.

FIG. 8 is a schematic view of an eddy current resistance generating device according to still another embodiment of the present disclosure. In FIG. 8, the eddy current resistance generating device includes a magnet base (its reference numeral is omitted), a plurality of magnets 520, a conductive member 530 and a friction set (its reference numeral is omitted). The magnet base includes two base members 511 and a connecting member 512, and has two inner walls 5111 on the base member 511, respectively. The base members 511 and the connecting member 512 are the same with the base members 511 and a connecting member 512, and will not be described again herein. The magnets 520 are disposed on the two inner walls 5111 of the magnet base, wherein the magnets 520 on the two inner walls 5111 are face to each other. The conductive member 530 is located between the magnets 520 on the two inner walls 5111 for generating an eddy current resistance while the magnets 520 are moved relative to the conductive member 530. The friction set is disposed between each of the magnets and the conductive member. The conductive member 530 can be disposed on the exercise equipment or the rehabilitation equipment which the eddy current resistance generating device applied on, and when the magnet base is driven along the conductive member 530, the magnets 520 are moved relative to the conductive member 530 for generating the eddy current resistance in accordance with Lenz's law. In order to avoid the abrasion between the magnets 520 and the conductive member 530, the friction set is disposed between each of the magnets 520 and the conductive member 530.

In detail, the friction set includes a plurality of friction matrices 540, each of the friction matrices 540 is coating layer, and is coated on an outer surface of each of the magnets 520, wherein the outer surface of each of the magnets 520 is face to the conductive member 530. Thus, the abrasion between the magnets 520 and the conductive member 530 can be avoided effectively.

Figure 9:
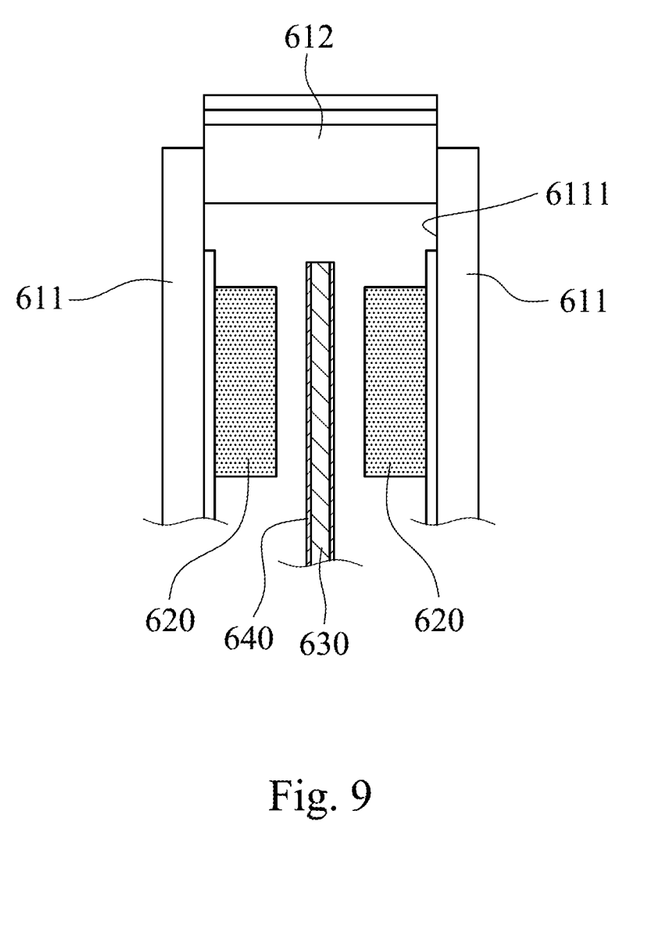
FIG. 9 is a schematic view of an eddy current resistance generating device according to further another embodiment of the present disclosure.

FIG. 9 is a schematic view of an eddy current resistance generating device according to further another embodiment of the present disclosure. In FIG. 9, the eddy current resistance generating device includes a magnet base (its reference numeral is omitted), a plurality of magnets 620, a conductive member 630 and a friction set (its reference numeral is omitted). The magnet base includes two base members 611 and a connecting member 612, and has two inner walls 6111 on the base member 611, respectively. The base members 611 and the connecting member 612 are the same with the base members 611 and a connecting member 612, and will not be described again herein. The magnets 620 are disposed on the two inner walls 6111 of the magnet base, wherein the magnets 620 on the two inner walls 6111 are face to each other. The conductive member 630 is located between the magnets 620 on the two inner walls 6111 for generating an eddy current resistance while the magnets 620 are moved relative to the conductive member 630. The friction set is disposed between each of the magnets and the conductive member. The conductive member 630 can be disposed on the exercise equipment or the rehabilitation equipment which the eddy current resistance generating device applied on, and when the magnet base is driven along the conductive member 630, the magnets 620 are moved relative to the conductive member 630 for generating the eddy current resistance in accordance with Lenz's law. In order to avoid the abrasion between the magnets 620 and the conductive member 630, the friction set is disposed between each of the magnets 620 and the conductive member 630.

In detail, the friction set includes two friction matrices 640, each of the friction matrices 640 is coating layer, and are coated on two side surfaces of each of the conductive member 630, and the two side surfaces are face to the magnets 620 on the two inner walls, respectively. Thus, the abrasion between the magnets 620 and the conductive member 630 can be avoided effectively.

Figure 10:
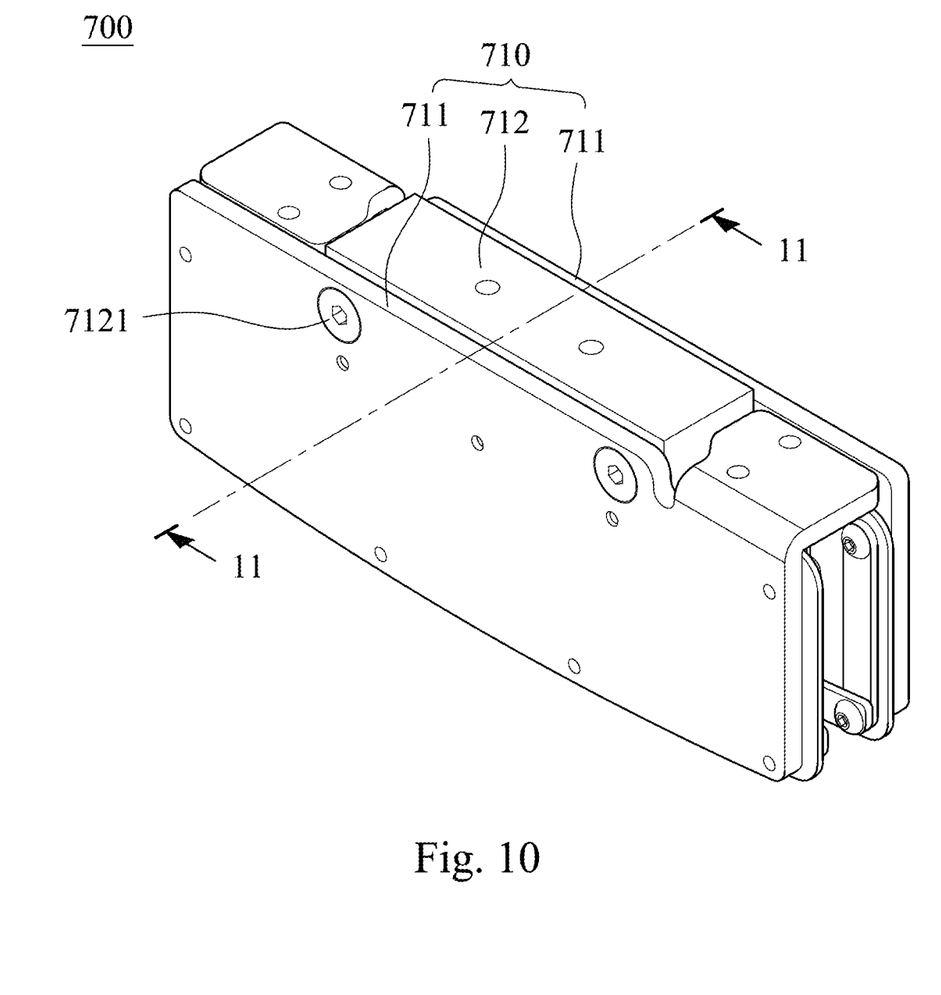
FIG. 10 is a three-dimensional schematic view of an eddy current resistance generating device according still another embodiment of the present disclosure.
Figure 11:
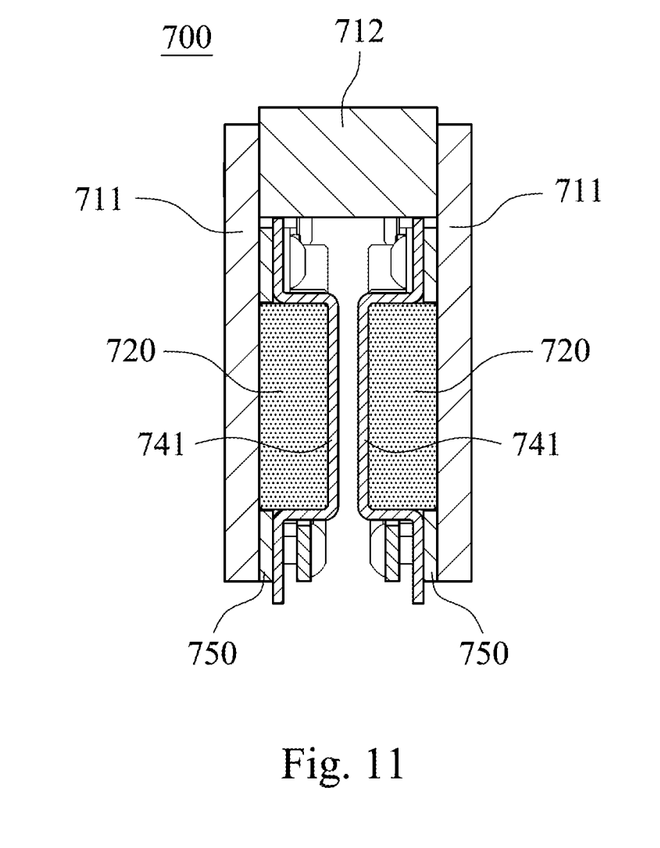
FIG. 11 is a cross-sectional view along line 11-11 in FIG. 10.
Figure 12:
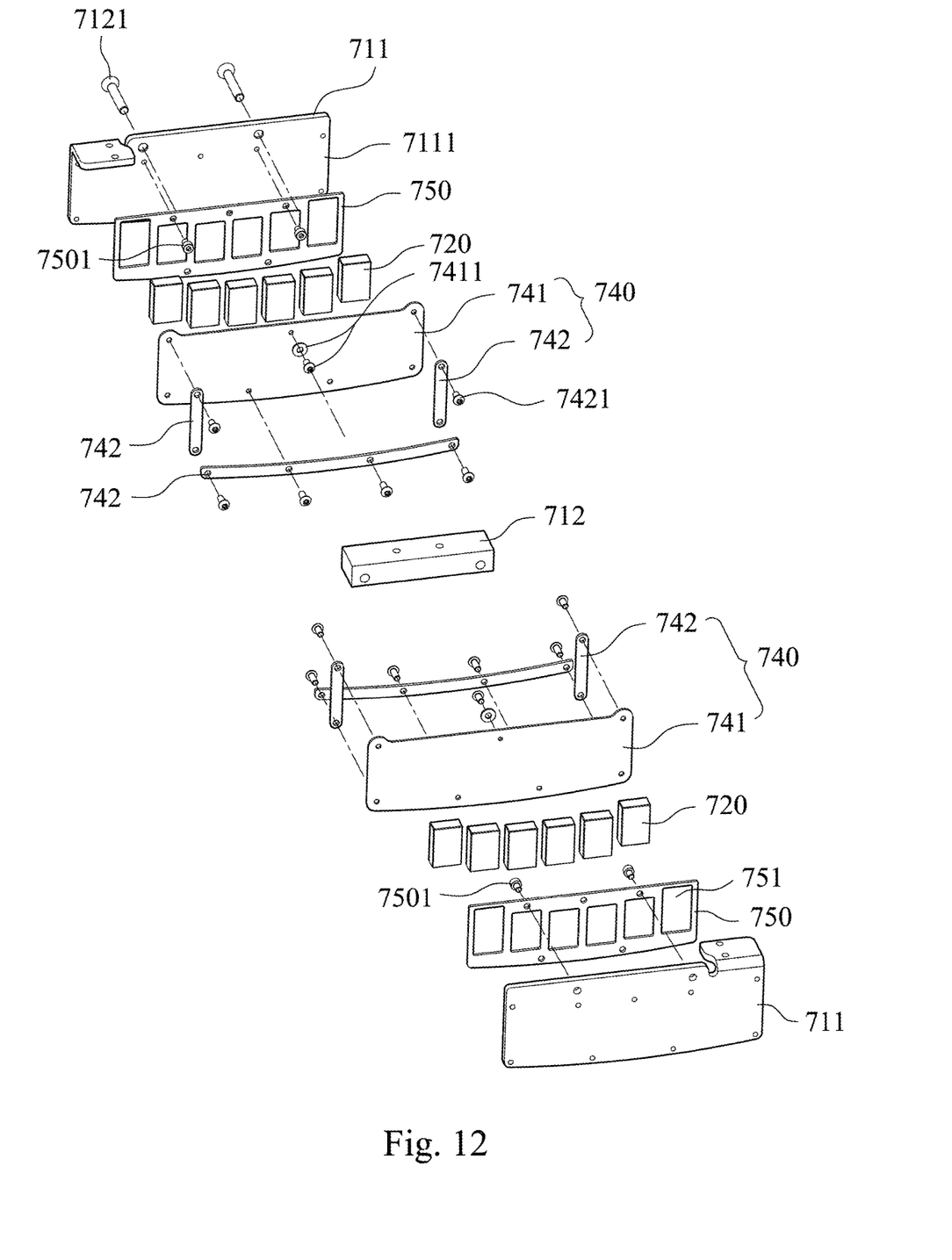
FIG. 12 is an exploded view of the eddy current resistance generating device in FIG. 10.

FIG. 10 is a three-dimensional schematic view of an eddy current resistance generating device 700 according still another embodiment of the present disclosure. FIG. 11 is a cross-sectional view along line 11-11 in FIG. 10. FIG. 12 is an exploded view of the eddy current resistance generating device 700 in FIG. 10. The eddy current resistance generating device 700 includes a magnet base 710, a plurality of magnets 720, a conductive member (not shown) and a friction set 740. The magnet base 710 has two inner walls 7111, the magnets 720 are disposed on the two inner walls 7111 of the magnet base 710, wherein the magnets 720 on the two inner walls 7111 are face to each other. The conductive member is located between the magnets 720 on the two inner walls 7111 for generating an eddy current resistance while the magnets 720 are moved relative to the conductive member. The friction set 740 is disposed between each of the magnets 720 and the conductive member. The conductive member can be disposed on the exercise equipment or the rehabilitation equipment which the eddy current resistance generating device applied on, and when the magnet base 710 is driven along the conductive member, the magnets 720 are moved relative to the conductive member for generating the eddy current resistance in accordance with Lenz's law. In order to avoid the abrasion between the magnets 720 and the conductive member, the friction set 740 is disposed between each of the magnets 720 and the conductive member.

In detail, the magnet base 710 includes two base members 711 and a connecting member 712. The base members 711 are connected to two sides of the connecting member 712 via connecting units 7121, such as screws. The inner walls 7111 are located on the two base members 711, respectively. Therefore, the magnet base 710 can be disassembled when the elements disposed inside are broken or should be changed instead of replacing the whole magnet base 710.

Figure 13:
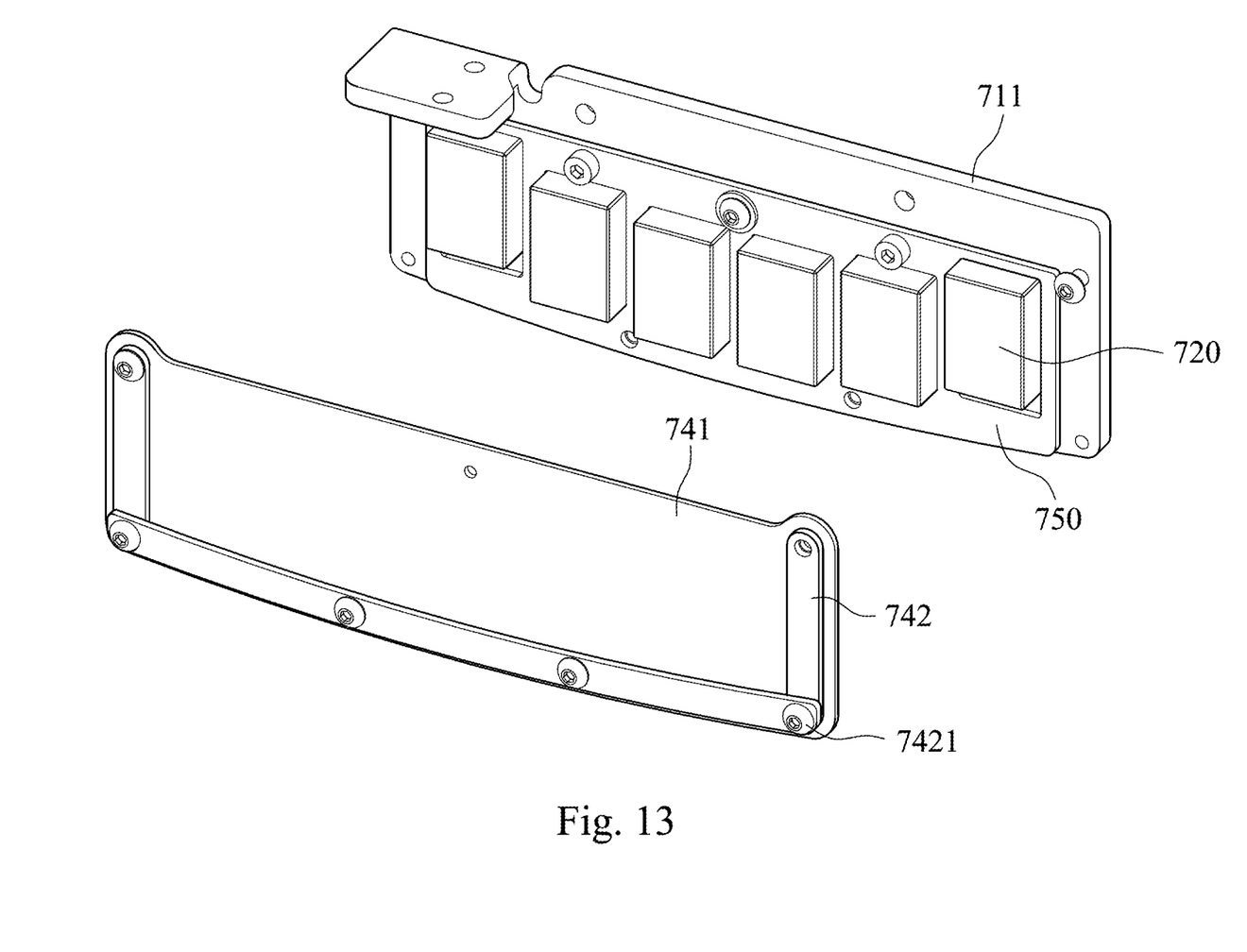
FIG. 13 shows a schematic view of the magnets of the eddy current resistance generating device of FIG. 10.

The magnets 720 are disposed on the two inner walls 7111 of the base members 711. According to the embodiment of FIG. 10, the eddy current resistance generating device 700 includes 12 magnets 720, and each 6 magnets 720 are disposed on each inner wall 7111. FIG. 13 shows a schematic view of the magnets 720 of the eddy current resistance generating device 700 of FIG. 10. In order to position the magnets, the eddy current resistance generating device 700 can further include two magnet positioning members 750 for positioning the magnets 720 on the two inner walls 7111, wherein each of the two magnet positioning members 750 has a plurality of positioning holes 751, and each of the magnets 720 is disposed and embedded in each of the positioning holes 751. Thus, the magnets 720 can be positioned on the inner walls 7111, and by the arrangement of the positioning holes 751, there is an interval between each two magnets 720 adjacent to each other. It is favorable for enhancing the stability of the magnets. Furthermore, the two magnet positioning members 750 are formed by plastic injection molding, and are formed into the same shape. Therefore, only one mold for forming the base members is needed so as to reduce the manufacturing cost.

The friction set 740 at least one friction matrix 741 covered on the magnets 720 on at least one of the two inner walls 7111. According to the embodiment of FIG. 12, a number of the at least one friction matrix 741 is two, wherein each of the two friction matrices 741 is covered on the magnets 720 on each of the two inner walls 7111, and the friction matrices 741 can be connected to the base members 711 via the connecting member 7411, such as screws. By the arrangement, the magnets 720 and the conductive member would not connect to each other directly, and the abrasion between the magnets 720 and the conductive member can be avoided effectively. Moreover, the friction matrices 741 can be made of fabric material, leather material, or plastic material, and will not be limited thereto. By such arrangement, the noise generated between the magnets 720 and the conductive member can be further avoided.

Furthermore, the friction set 740 can further includes at least one pressing plate 742 for positioning the friction matrix 741 on the at least one of the two inner walls 7111. According to the embodiment of FIG. 12 and FIG. 13, a number of the pressing plate 742 is six, wherein each three pressing plates 742 are for positioning each friction matrix 141 on each of the two inner walls 1111. In detail, each three pressing plates 742 are connected to each friction matrix 141 along three sides thereof via connecting members 7421 so as to position the friction matrix 741 on the base member 711. Hence, each three pressing plates 742 and each friction matrix 741 can be positioned in the magnet base 710 stably, and it is favorable for arranging the friction matrices 741 to cover the magnets 720 and will not affect the generation of the eddy current resistance while dispose the friction matrix 741 between the magnets 720 and the conductive member.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An eddy current resistance generating device for an exercise equipment or a rehabilitation equipment, comprising:
    a magnet base having two inner walls;
    a plurality of magnets disposed on the two inner walls of the magnet base, wherein the magnets on the two inner walls are facing each other;
    a conductive member located between the magnets on the two inner walls for generating an eddy current resistance while the magnets are moved relative to the conductive member; and
    a friction preventing set disposed between each of the magnets and the conductive member, wherein the friction preventing set comprises:
    at least one friction preventing matrix covering the magnets on at least one of the two inner walls; and
    at least one pressing plate for positioning the friction preventing matrix on the at least one of the two inner walls.

2. The eddy current resistance generating device of claim 1, further comprising:
    two magnet positioning members for positioning the magnets on the two inner walls, wherein each of the two magnet positioning members has a plurality of positioning holes, and each of the magnets is disposed in each of the positioning holes.

3. The eddy current resistance generating device of claim 2, wherein the two magnet positioning members are formed by plastic injection molding.

4. The eddy current resistance generating device of claim 1, wherein the at least one friction preventing matrix is made of fabric material, leather material, or plastic material.

5. The eddy current resistance generating device of claim 1, wherein a number of the at least one friction preventing matrix is two, wherein each of the two friction preventing matrices is covering the magnets on each of the two inner walls.

6. The eddy current resistance generating device of claim 1, further comprising:
    two interval members for positioning the magnets on the two inner walls, wherein each of the two interval members has a plurality of positioning concave structures, and each of the magnets is disposed in each of the positioning concave structures.

7. The eddy current resistance generating device of claim 1, wherein the magnet base is integrally formed by iron material.

* * * * *